United States Patent [19]
Gharpurey et al.

[11] Patent Number: 5,267,642
[45] Date of Patent: Dec. 7, 1993

[54] SKIRT BOARD AND IMPACT SADDLE ASSEMBLY FOR CONVEYOR BELTS

[75] Inventors: Chandragupta M. Gharpurey, Barboursville, W. Va.; Lewis D. Stoll, Ft. Byron, Ill.

[73] Assignee: Richwood Industries, Inc., Huntington, W. Va.

[21] Appl. No.: 962,324

[22] Filed: Oct. 15, 1992

[51] Int. Cl.⁵ .............................................. B65G 15/18
[52] U.S. Cl. ................................. 198/836.1; 198/836.3
[58] Field of Search ............ 198/525, 636, 823, 836.1, 198/836.2, 836.3

[56] References Cited

U.S. PATENT DOCUMENTS

| | | | |
|---|---|---|---|
| Re. 31,249 | 5/1983 | Stahura | 198/525 |
| 3,499,523 | 3/1970 | Clegg | 198/836.1 |
| 3,989,137 | 11/1976 | Ward | 198/836.1 |
| 4,204,595 | 5/1980 | Marrs | 198/836.1 |
| 4,641,745 | 2/1987 | Skates | 198/836.1 |
| 4,789,056 | 12/1988 | Bourbeau | 198/823 |
| 4,874,082 | 10/1989 | Swinderman | 198/836.1 |
| 4,898,272 | 2/1990 | Swinderman et al. | 198/823 X |
| 5,007,528 | 4/1991 | Hideharu | 198/823 |
| 5,038,924 | 8/1991 | Stoll | 198/823 |

FOREIGN PATENT DOCUMENTS

| | | | |
|---|---|---|---|
| 0288641 | 7/1970 | U.S.S.R. | 198/836.3 |
| 1452247 | 10/1976 | United Kingdom | 198/836.3 |
| 2188018 | 9/1987 | United Kingdom | |

*Primary Examiner*—James R. Bidwell
*Attorney, Agent, or Firm*—Biebel & French

[57] ABSTRACT

A modular skirt board clamp and saddle assembly for a bulk material conveyor includes a plurality of individual saddle frames which extend transversely of the direction of belt movement, arranged in longitudinal side-by-side relation, and each frame supporting a plurality of polymeric low friction blocks or segments, defining a belt supporting surface. Skirt board support arms are positioned at each lateral side of the assembly with lower ends joined to one of the lateral ends of the saddle frames, and extending vertically above the segments and transversely toward the opposite side. A pair of skirt boards are supported in clamping segments or plates, mounted on the arms, in which one of the clamping plates is fixed to the inner end of the arm, and the other is movable by a hand-operated, toggle mechanism. The belt is supported in immediate underlying relation to the skirt boards by elongated polymeric support segments which extend in common to each of the saddle frames.

4 Claims, 5 Drawing Sheets

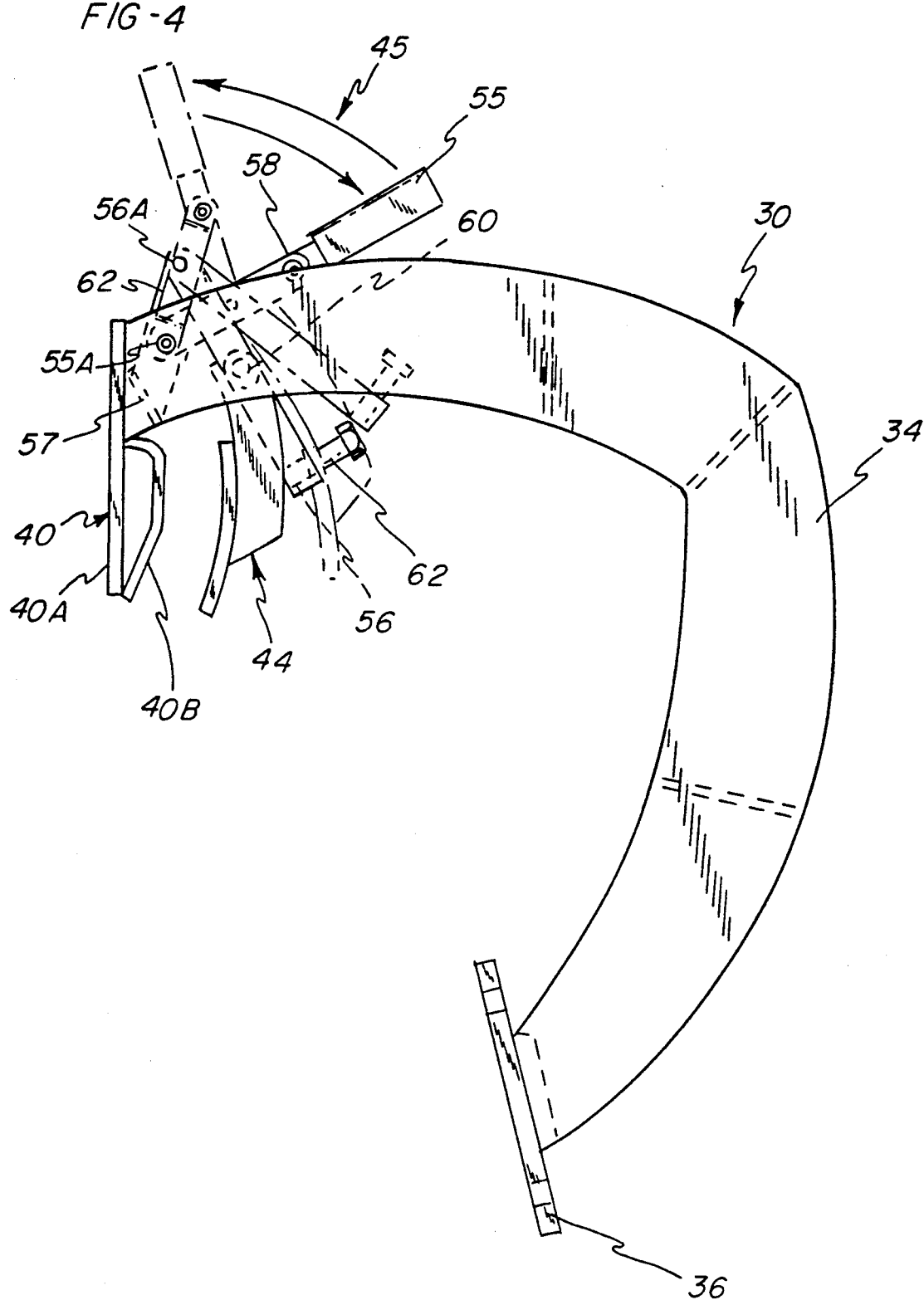

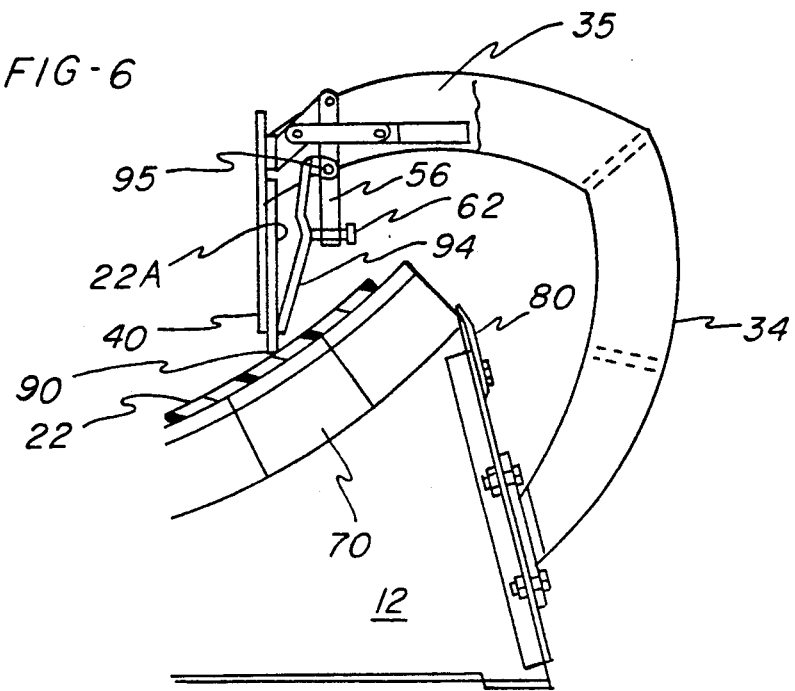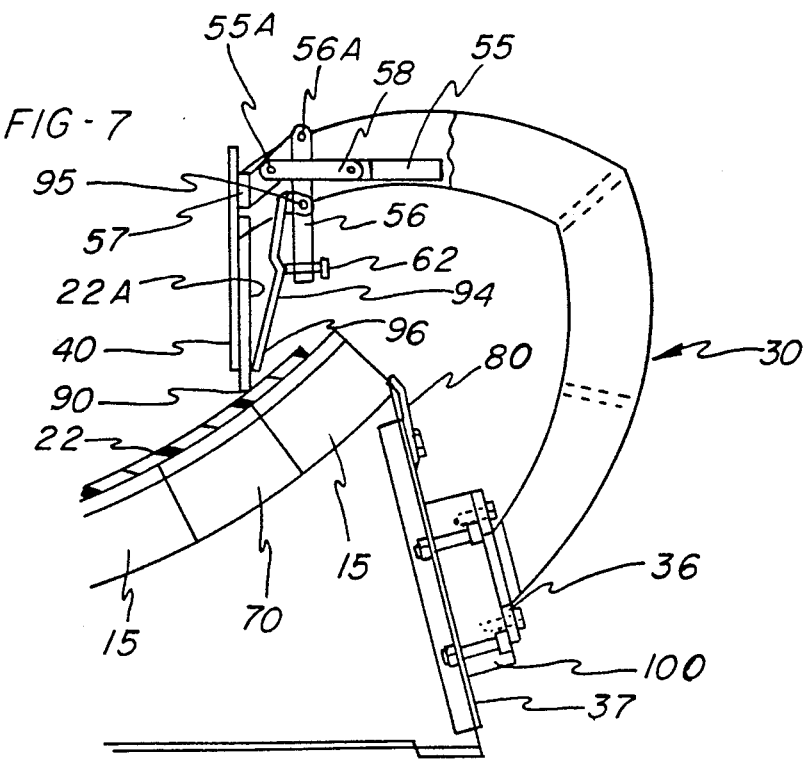

SKIRT BOARD AND IMPACT SADDLE ASSEMBLY FOR CONVEYOR BELTS

BACKGROUND OF THE INVENTION

This invention relates to a skirt board and saddle assembly for bulk material belt-type conveyors, and more particularly to a modular assembly in which the skirt boards are removably and adjustably supported on individual arms which are each associated with one of a plurality of transversely positioned impact frames. Frequently, skirt boards are used at the loading zone, although they may be used at any location along the conveyor belt where edge sealing is desired.

Loading or impact areas on belt-type conveyors, for conveying bulk material such as coal, limestone and the like, commonly employ a pair of elastomeric skirt boards which extend along the sides of the impact zone and parallel to the direction of movement of the belt. The sheet boards guide the material to the center of the belt and away from the edges. Also they seal the impact area from spillage due to fine airborne particles spilling over the edges of the belt.

When skirt boards are used in conjunction with conventional idlers, the skirt boards have difficulty in sealing where the belt sags from one idler to the next, thereby allowing the seal to be broken between the belt and the skirt board rubber. In addition, the user must fabricate some type of a support system to hold the skirt board clamping system in place.

Skirt boards are often used in combination with a chute provided by the user of the belt-type conveyor. Sometimes the skirt boards are actually supported by the delivery chute as illustrated, for example, in U.S. Pat. No. 4,874,082 issued Oct. 17, 1989. Since these skirt boards are supported by the chute, rather than by the troughing support assembly, it is difficult to maintain an adjustment between the skirt board and the underlying running surface of the belt, particularly where the belt is suspended between impact rollers as shown in patent '082.

U.S. Pat. No. 3,499,523 issued Mar. 10, 1970 shows a further example of a skirt board arrangement combined with a conveyor belt supported on spaced impact rollers. The skirt board is supported by some "super structure" above the conveyor belt, but not formed an integral or modular part of the belt troughing and supporting arrangement.

A further example illustrating an arrangement for locating and positioning a pair of opposed skirt boards in relation to the surface of a conveyor belt is shown in U.S. Pat. No. 5,007,528 issued Apr. 16, 1991. In this reference, a longitudinally extending skirt board is mounted on an auxiliary structure by which the entire board moves as a unit, and is weight counter-balanced at one of its ends.

Not all impact zones use impact rollers. Devices known as slider beds have come into use, in which a frame supports a plurality of longitudinally extending individual bars having polymeric exposed upper surfaces across which the belt can slide in a loading zone. British patent 2,188,018 published Sept. 23, 1987 illustrates one such slider trough and also illustrates in phantom in FIG. 3, a pair of flexible skirt boards 29 supported from the lower lip of an overhead feed trough. In U.S. Pat. No. 4,789,056 issued Dec. 6, 1988, a slider bed is shown with trough-like side plates supported from the troughing frames positioned at either side of the belt, but no skirt board arrangement, as such, is disclosed.

SUMMARY OF THE INVENTION

The present invention provides modularized skirt board supports in combination with each of a plurality of transverse saddle frames. The saddle frames are constructed in accordance with assignee's U.S. Pat. No. of Stoll, 5,038,924 issued Aug. 13, 1991, the disclosure of which is incorporated herein by reference and is hereafter referred to as patent '924. These frames may take the place of conventional impact rollers. Each frame supports a plurality of individual high density polymeric blocks on curved support members formed in the upwardly facing curved top of the saddle frame.

Skirt board arm means are attached to each of the transverse ends of the saddle frames and extend upwardly and transversely inwardly over the upper edge of the saddle. The arm means have clamping mechanisms which releasably support a skirt board between an outer stationary or fixed clamp segment, attached to an inner end of the support arm means, and a movable inner clamp segment also attached to the arm means. The clamping mechanisms are easily accessible from an adjacent side of the impact zone, at each of the saddle frames, for loosening and lowering and/or raising the clamped skirt board so that it may be maintained in smooth and low-wearing contact with an upper surface of the belt supported on the saddles along the impact zone.

In order to support the belt free of sags at the skirt boards, one of the polymeric segments in each of the frames, as shown in patent '924, is removed and is replaced by a single longitudinally extending continuous segment, common to each of the saddle frames. Preferably, one of these continuous segments is positioned at each lateral side of the belt in underlying relation to the lower edge of the skirt board. The invention provides means for the use of either straight or inwardly curved skirt boards, as desired.

Preferably a pair of the support arm means are associated with each of the transversely positioned troughing frames, and are identical or substantially identical to each other, thereby permitting an economy of manufacture and permitting an interchange of parts, as desired. The clamp mechanism by which the skirt board is retained is shown in two embodiments, one for a flat skirt board and the second for a skirt board which has a lower inwardly curved portion which rides on the upper surface of the belt. In the case of the flat or non-curved board, the lower edge contacts the belt along a narrow transverse line. The clamp members or segments are configured to accommodate these different configurations of skirt boards. Provision is also incorporated by which the relative position of the clamp segments may be adjusted with respect to the transverse edge of the belt to accommodate variations in belt width, or to adjust the position of the skirt board in relation to the edge of the belt or the position of the chute.

The modular construction of this invention provides low cost and effective apparatus for securing a skirt board in which the supporting arms and structure are, themselves, supported directly on the side walls of a troughing frame. The skirt board clamp segments are operable and adjustable at each of these frames providing a high degree of versatility as well as ease of operation.

It is accordingly an important object of this invention to provide a modularized skirt board support for a trough-forming slider assembly.

A further object of the invention is the provision of a modular skirt board clamp and saddle assembly for use with a bulk material conveyor in which there are a plurality of supporting frames, such as at an impact zone, and a corresponding plurality of skirt board clamp members fixed to and supported on the support frames.

These and other objects and advantages of the invention will be apparent from the following description, the accompanying drawings and the appended claims.

BRIEF DESCRIPTION OF ACCOMPANYING DRAWINGS

FIG. 4 is an enlarged fragmentary detail of one of the clamp assemblies and clamp support arms;

FIG. 5 is a side elevation of the elongated polymeric segment employed with this invention;

FIG. 6 is a fragmentary end view of an embodiment showing clamp segments for flat or non-curving skirt boards; and FIG. 7 shows a modification of FIG. 6 for adjusting the transverse position of the support arms in relation to the belt.

DESCRIPTION OF PREFERRED EMBODIMENTS

Figure 1:
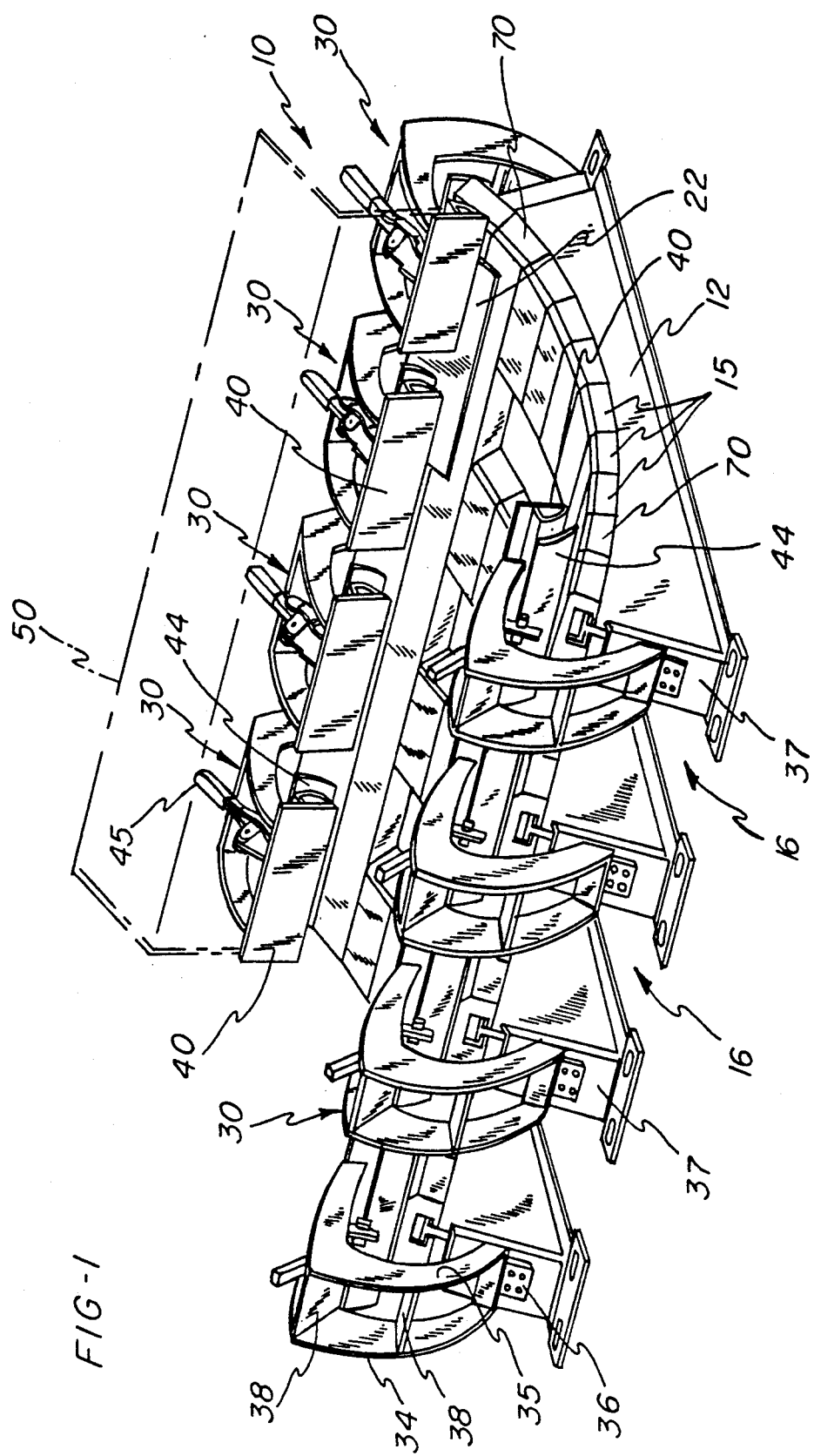
FIG. 1 is a perspective view of a modular skirt board clamp and saddle assembly according to this invention.

Referring to the figures of the drawing, which illustrate preferred embodiments of the invention, a modular skirt board clamp and saddle assembly for use with bulk material conveying is illustrated generally at 10 in FIG. 1. The assembly includes a plurality of individual supporting saddle frames 12, each of which support, on an upper, upwardly-facing curved surface, a plurality of individual polymeric low-friction belt support segments 15. The saddle frames 12 and the individual support segments 15 may be configured as disclosed in the patent '094. The saddle frames and the supported segments 15 form a stationary sliding surface such as at the impact or loading zone of a bulk material belt-type conveyor, or at any other location where edge sealing is desired.

A plurality of the support saddle frames 12 are employed, four being illustrated in FIG. 1. The frames 12 each extend transversely of the direction of movement of a conveyor belt and, as shown, are arranged in longitudinal, generally side-by-side relation to each other. The longitudinal direction is defined as the direction of belt travel.

The position of the individual frames 12 may correspond to the position normally occupied by conventional impact idlers, which the saddles and segments are designed to replace. Therefore the individual frames and the polymeric segments supported thereon are generally not positioned in immediate side-by-side relation, but define therebetween open spaces as shown by the spaces 16 in FIG. 1.

Figure 2:
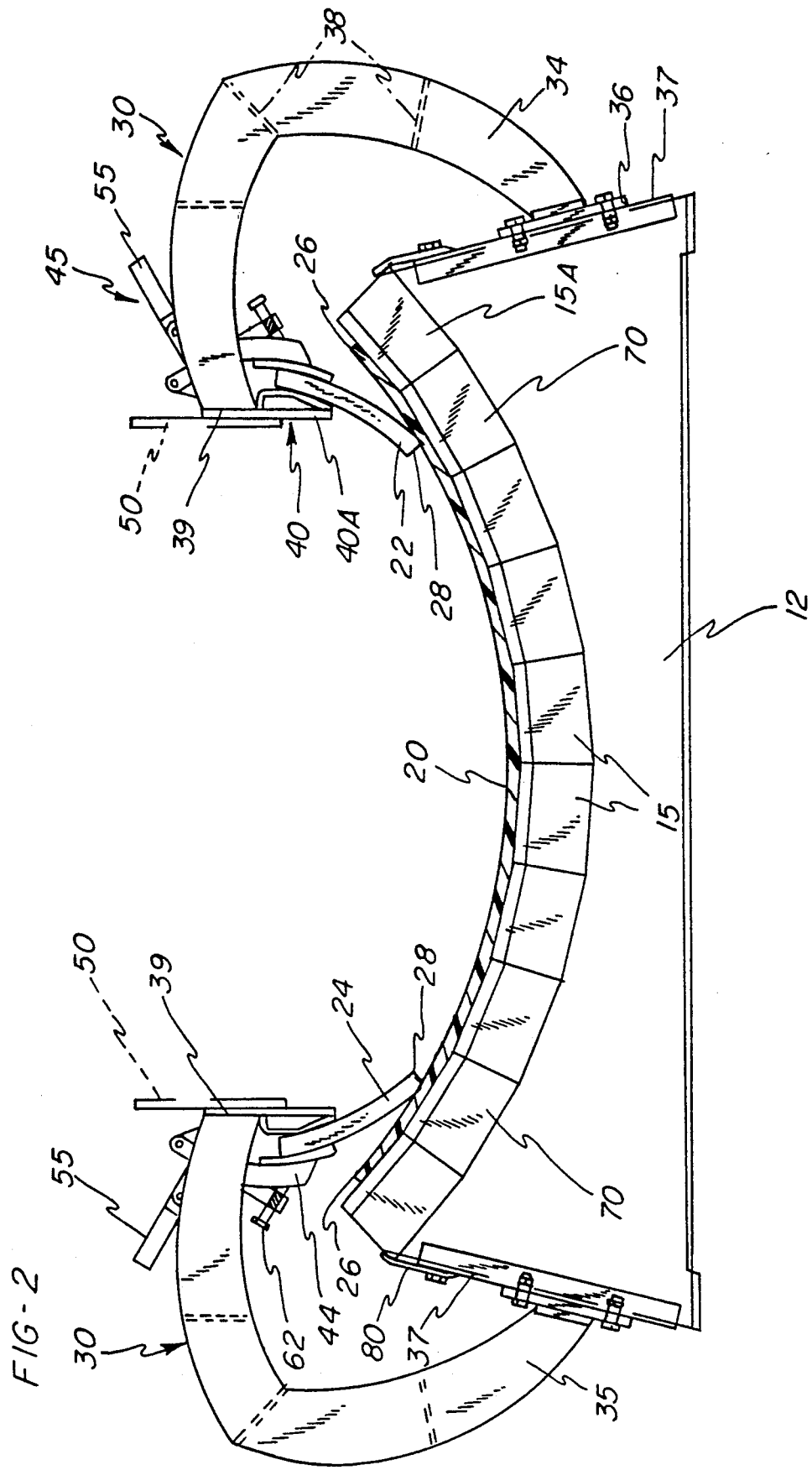
FIG. 2 is an end elevation of the assembly of FIG. 1 showing the conveyor belt in cross-section.

As shown in sectional view in FIG. 2, a conveyor belt 20 rides on the upper exposed curved surfaces of the segments 15 and across the open spaces 16 defined between the frames 12. For the purpose of clarity, the belt 20 is not illustrated in FIG. 1. It will be understood that the belt supporting segments 15 are preferably made of a high density polymeric material, such as high molecular weight polyethylene as described in patent '924.

In accordance with this invention, a pair of laterally spaced skirt boards 22 and 24 extend longitudinally along the lateral sides of the belt 20 and generally vertically above the upper surface of the belt for the purpose of guiding bulk material away from the belt edges 26. In the case of an impact zone, the skirt boards seal the impact zone from spillage over the sides of the belt. The skirt boards 22 and 24, shown in end elevation in FIG. 2, are flexible and have lower ends 28 which are bent or deflected laterally, thereby providing for the running of the lower end of the skirt board in lapping relation to the upper surface of the belt. Alternatively, more rigid, generally vertically extending skirt boards as illustrated at 22a in FIGS. 6 and 7 may be used in conjunction with a modified clamp arrangement shown in those drawings.

The skirt boards, on each side of the assembly 10, are supported on a plurality of generally identical support arm means illustrated generally at 30 in FIG. 1. Each of the arm means 30 forms an assembly of parts by which the skirt board 22 or 24 is removably and adjustably positioned in relation to the upper surface of the belt 20 adjacent the belt lateral sides or edges 26. Two of the arm means 30 are used for each of the saddle frames 12, one at each lateral end thereof, and supported directly on the frames.

Each arm means 30 includes a pair of upwardly and inwardly curved arm elements 34 and 35 joined at a common support bracket 36 at their lower ends. The bracket 36 is the means of which the arm elements 34 and 35 are secured to the sloping flat end plate 37 which closes each of the opposite ends of the frames 12. The arm means are thus held in relatively rigid and fixed relation with respect to the frame ends. The spaced arm elements 34 and 35 are joined together in pairs by a plurality of rigid spacer plates 38 which are welded at their ends, thereby forming a rigid arm structure.

As seen in the side elevation of FIG. 2, the arm elements 34 and 35 extend relatively upwardly to a point which is spaced from and above the lateral ends of the frame 12, as defined by the end segment block 15a, and then transversely of the support saddle frame. The upper ends individual arm elements terminate at inwardly facing ends 39.

The invention further includes a plurality of individual, longitudinally extending skirt board clamp segments, corresponding in number to the plurality of arm means 30. The clamp segments make up an inner transversely extending clamping segments or plate 40, fixedly attached to the arm ends 39, such as by welding, and a pivotally movable outer clamping plate 44 mounted on a toggle mechanism 45 to the arm means 30. The clamp segments thus described form back-up supports for the skirt board, each extending generally parallel to each other and longitudinally of the length of an impact zone, as shown, for example, in FIG. 1. While the plates 40 and 44 extend longitudinally, such as for about 20 inches, they are spaced from the corresponding plates of an adjacent skirt board support arm means.

The inner clamp 40 is formed in two parts. The first part consists of an inside generally vertically extending flat plate 40a to which is welded an inside skirt-engaging plate portion 40b. The lateral inside plate 40a, welded to the inner ends 39 of the arm means, provides a flat surface by which the user can attach the lower ends of a chute 50, as shown in phantom in FIGS. 1 and 2. Since this plate is stationary, it provides a firm support for such a chute. In some installations, a chute may not be required.

The outer plate portion 40b provides a skirt-engaging clamping surface which cooperates with the opposite facing surface of the movable clamp segment 44, so as to provide a firm grip at the top of the respective skirt board. The curved clamp surfaces also position the skirt board 22 or 24 generally in the direction of belt transverse curvation in the trough.

The movable skirt board clamp segment or plate 44 is pivotally carried on the arm means 30, by means of the over-center positive-acting toggle mechanism 45. As best seen in FIG. 4, the toggle mechanism 45 has a hand-operating handle or lever 55 and a rod 56 which extends generally downwardly from a bracket 57 attached to the back side of the plate 40. The rod 56 is pivoted on the bracket 57 at a pivot 56a. The handle 55 is also pivoted on the rod 56 at a pivot 55a and is also connected to the bracket 57 by a pivot or toggle line 58.

The movable skirt clamp segment 44 is pivotally attached to the rod 56 at a pivot 60, and its relative position is maintained by a threaded adjustment screw 62 extending through the lower end of the rod 56 and into contact with the plate 44. The screw 62 is the means of which the gap between the clamping segments may be adjusted.

When the handle 55 is elevated or raised, as shown in phantom in FIG. 4, the movable clamp segment plate 44 is retracted with respect to the fixed or inner clamp segment 40 for releasing the respective skirt board. When the handle 55 is lowered, the toggle link 58 becomes parallel to the handle, and the clamping plates 40 and 44 are firmly held in a predetermined clamping position. A suitable toggle mechanism 45 for use with this invention is Model 528 "Hold Down Action Clamp" made by DE-STA-Co., P.O., Box 28090, 250 Park Street, Troy, Mich. 48007.

There is one toggle mechanism 45 for each of the arm means 30 at each lateral side of the impact saddle assembly 10, and provides the means by which the respective skirt boards may be easily removed or inserted and clamped in a desired position with respect to the underlying belt 20. Since the handles 55 of the toggle mechanisms 45 are easily accessible from the lateral sides of the saddle assembly, the maintenance and adjustment of the skirt boards 22 and 24 may be readily accomplished, without interrupting the operation of the belt-type conveyor.

Figure 3:
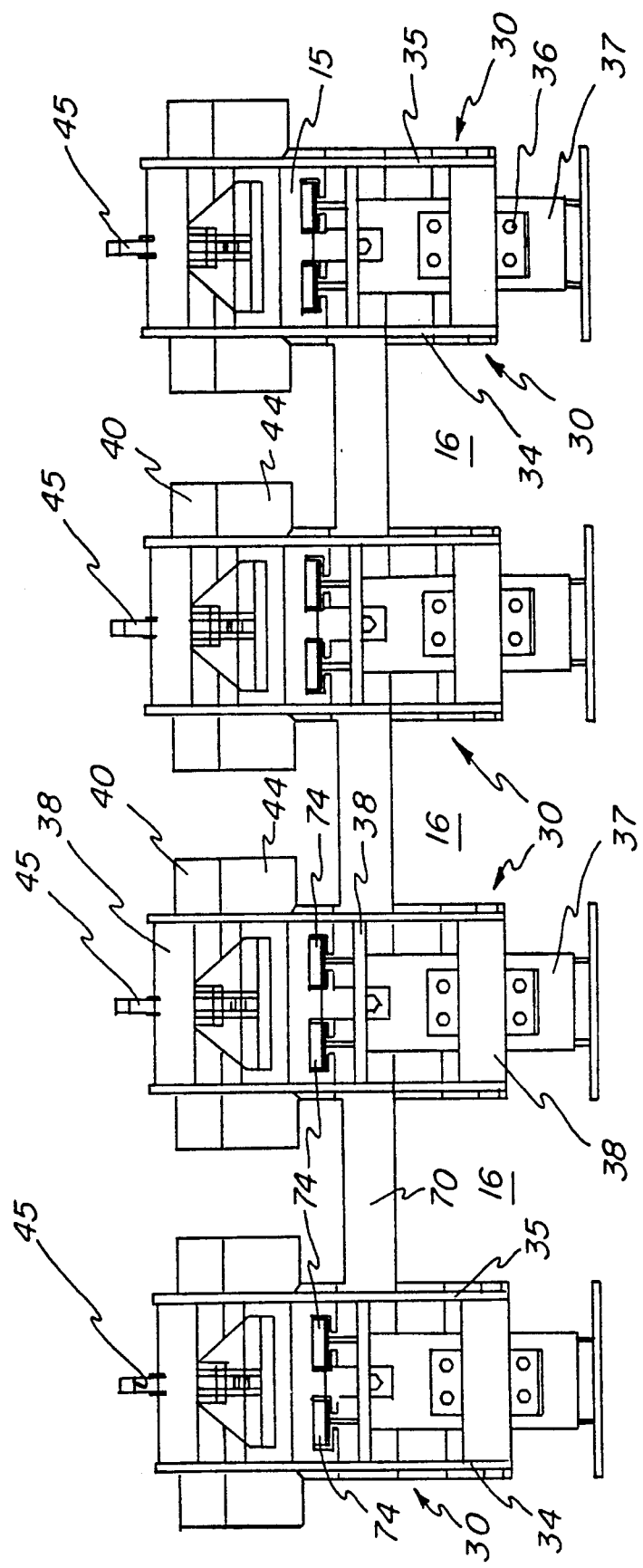
FIG. 3 is a side elevation of the assembly.

It has been previously noted that the individual saddle frames 12 support individual polymeric segments or blocks 15. However, for the purpose of providing an uninterrupted contact surface for the belt in immediate opposition to the skirt board 22 or 24, one of the individual blocks at each lateral side of the saddle frames is replaced by a longitudinally elongated continuous support segment 70, as shown in side elevation in FIG. 5. The elongated segment 70 may be formed of the same high density polymeric material as that of the individual segments 15, previously described, and as detailed in patent '924. The segment 70 is formed, along its length, with pairs of T-shaped slots or recesses 72 corresponding to the position of the respective T-shaped transversely curved support members 74 (FIG. 3) of the support frames 12. In the embodiment of the assembly illustrated, four of the saddle frames 12 are shown, although fewer or greater number may be used within the scope of this invention. Accordingly for this embodiment, the elongated support segments 70 are formed with four pairs of T-shaped slots 72 corresponding to the longitudinal spaced-apart distances of the frames 12.

The continuous segments may be easily threaded onto the frames 12 during the assembly of the individual segments 15 thereon and, where necessary, may be removed from a lateral position where replacement or repair is necessary. Advantageously, the arm means 30 are shaped so as to provide sufficient space for the insertion and removal of the segments 15 and 70 merely by removing the hold-down or retainer clips 80 (FIG. 2), without disturbing the arrangement or alignment of the arm means.

The embodiment of FIGS. 6 and 7, in which like parts are represented by like reference numerals, show a modification of the clamping segments for the purpose of supporting a relatively vertically oriented and relatively rigid skirt board 90. The inner plate 40a of the embodiment of FIG. 2 is retained, while the inner curved contacting plate portion 40b is removed. The laterally outer or movable skirt board clamp segment 44 is replaced by a pressure plate 94 having and upper end pivoted at 95 on the rod 56 and having a lower end 96 in pressure contact with the skirt board 22a in opposition to the segment 40a. The contact, as well as the pressure of contact, may be adjusted by the bolt 62, as in the preceding embodiment.

The lateral space or position of the skirt boards, in either embodiment, may be adjusted with respect to the edge of the belt by means of a spacer block 100 positioned between the flange 36 and the adjacent end wall 37 of the frame 12, as illustrated in FIG. 7. Normally, a typical block 100 may have a thickness of two inches, to provide an approximate two inch adjustment of the position of running contact of the skirt board, at either side of the troughing system of this invention. It is, however, preferred that the adjustment maintain the pressure contact on the belt 20 at a position where the belt is backed up by the continuous impact segment 70 of FIG. 5.

The operation of this invention is believed to be largely self-evident from the foregoing description. The clamping arrangement as illustrated in the embodiment of FIGS. 2 and 4 is preferred where a flexible skirt board is used, since the curved configuration of the contacting surfaces of the clamp segments is such as to induce a curvature into the skirt board to assist in conforming the same to the curvature of the belt. The clamp arrangement of FIGS. 6 and 7, however, is preferred for use with relatively rigid vertical skirt boards, which may be preferred.

A chute 50 or other guide way may conveniently be attached directly to the outer surface of the fixed clamp segments 40, thereby assuring a continuity between the walls of the chute and an impact trough. The skirt boards themselves are held in rigid relation to the same troughing frames which make up an impact trough assembly, and a gap free contact between the skirt board and the belt is assured by the use of continuous support segments in the region of skirt board contact with the belt. The over-center toggle clamp arrangement and the pressure bolt provides for ease of adjustment for varying skirt board heights and thicknesses.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A modular skirt board clamp and saddle assembly for use with a bulk material conveyor belt and forming a stationary sliding surface for supporting the conveyor belt, such as at an impact or loading zone, and further having means for supporting a pair of laterally spaced-apart skirt boards extending longitudinally along such zone and above the upper surface of the belt, to guide such bulk material away from the belt edges and to seal the zone from spillage over the edges of the belt, comprising:

a plurality of individual saddle frames each extending transversely of the direction of belt movement is such zone and terminating at lateral ends positioned outwardly of such conveyor belt, and arranged in longitudinal side-by-side relation to each other in the direction of belt travel, said saddle frames supporting low friction belt support means thereon defining upwardly facing curved belt supporting surfaces, a plurality of skirt board support arm means one each of each said lateral end of said saddle frames, each of said arm means having a lower end joined at one lateral end of an associated said saddle frame and extending generally vertically above said low friction belt support means and transversely inwardly toward the opposite said arm means and terminating at ends, a plurality of individual, longitudinally extending skirt board fixed clamp segments, one each mounted on said arm mean ends and forming back-up supports for a skirt board, a corresponding plurality of movable skirt board clamp segments, one for each of said fixed clamp segments, means mounting said movable clamp segments on the associated said arm means laterally adjacent of one of said fixed clamp segments, and clamp mechanisms for each of said movable clamp segments connecting said movable clamp segments to the associated said arm means and providing for movement of said movable clamp segments toward and away from the associated said fixed clamp segment for removably clamping and supporting a longitudinal portion of a skirt board therebetween for holding a lower edge of such skirt board in a predetermined running engagement with the upper surface of the conveyor belt.

2. The assembly of claim 1 further comprising block means between said arm means lower end and said saddle frame lateral end for adjusting the position of an associated skirt board to the belt.

3. A modular skirt board clamp and impact saddle assembly for use with a bulk material conveyor belt and forming a stationary sliding surface for supporting the conveyor belt, and further having means for supporting a pair of laterally spaced-apart skirt boards extending longitudinally along such belt generally vertically and above the upper surface of the belt, to guide such bulk material away from the belt edges, comprising:

a plurality of individual saddle frames each extending transversely of the direction of belt movement at said sliding surface and terminating at lateral ends positioned outwardly of the conveyor belt and arranged in longitudinal side-by-side relation to each other in the direction of belt travel, each of said saddle frames supporting a plurality of polymeric low friction segments thereon defining upwardly curved belt supporting surfaces, which surfaces are higher at the lateral ends of said frames than at the transverse centers thereof thereby forming a transversely curved belt-supporting trough-like surface, a plurality of skirt board support arm means, one each for said lateral end of said saddle frames, each of said arm means having a lower end joined with one lateral end of an associated said saddle frame and extending generally vertically above said surface and transversely inwardly toward the opposite said arm means and terminating at inwardly facing ends, a plurality of individual, longitudinally extending skirt board fixed clamp segments, one each mounted on said arm means ends and forming back-up supports for a skirt board, a corresponding plurality of movable skirt board clamp segments, one for each of said fixed clamp segments, means mounting said movable clamp segments on the associated said arm means laterally outside of one of said fixed clamp segments, and clamp mechanisms, one each for each of said movable clamp segments connecting said movable clamp segments to the associated said arm mean sand providing for movement of said movable clamp segments laterally toward and away from the associated said fixed clamp segments for removably clamping and supporting a longitudinal portion of a skirt board therebetween so that a lower edged of such skirt board is held in a predetermined running engagement with the upper surface of the belt.

4. The assembly of claim 3 further comprising a pair of longitudinally elongated polymeric segments common to each of said saddle frames, one each extending generally in underlying relation to an associated one of said skirt boards so that the belt is supported thereon against sagging between adjacent said saddle frames.

* * * * *